US012596536B2

(12) United States Patent
Douglas

(10) Patent No.: US 12,596,536 B2
(45) Date of Patent: Apr. 7, 2026

(54) DEPENDENCY ANALYSIS THROUGH CLASS FILE MANIPULATION

(71) Applicant: Red Hat, Inc., Raleigh, NC (US)

(72) Inventor: Stuart Wade Douglas, Canberra (AU)

(73) Assignee: Red Hat, Inc., Raleigh, NC (US)

( * ) Notice: Subject to any disclaimer, the term of this patent is extended or adjusted under 35 U.S.C. 154(b) by 181 days.

(21) Appl. No.: 17/953,576

(22) Filed: Sep. 27, 2022

(65) Prior Publication Data

US 2024/0103820 A1      Mar. 28, 2024

(51) Int. Cl.
*G06F 8/40* (2018.01)
*G06F 8/41* (2018.01)
*G06F 8/71* (2018.01)
*G06F 16/11* (2019.01)

(52) U.S. Cl.
CPC ............... *G06F 8/433* (2013.01); *G06F 8/71* (2013.01); *G06F 16/113* (2019.01)

(58) Field of Classification Search
CPC ........... G06F 8/433; G06F 8/71; G06F 16/113
See application file for complete search history.

(56) References Cited

U.S. PATENT DOCUMENTS 10,102,212 B2    10/2018  Zizka et al.
10,783,243 B2 *   9/2020  Loch .................. G06F 12/1416

11,347,498 B2    5/2022   Elias et al.
2009/0037577 A1*  2/2009   Theobald .............. G06F 40/169
                                                          709/224
2018/0129712 A1    5/2018   Mankovskii
2021/0405982 A1   12/2021   Douglas et al.
2022/0197998 A1    6/2022   Barber et al.
2024/0069930 A1*   2/2024   Veres ........................ G06F 8/71

OTHER PUBLICATIONS

Donohue, Tom. "How to find out where a Maven dependency comes from," Sep. 4, 2022, pp. 1-11, XP093071765, Retrieved from the Internet: URL: https://www.tutorialworks.com/maven-find-transitive-dependencies/ [retrieved on Aug. 8, 2023].
Extended European Search Report of Application No. 22214220.0, mailed Aug. 17, 2023, 12 pages.

(Continued)

*Primary Examiner* — Hanh Thi-Minh Bui
(74) *Attorney, Agent, or Firm* — Womble Bond Dickinson (US) LLP

(57) ABSTRACT

A processing device may receive a request for dependency information indicative of one or more class files included in an archive file. The processing device may fetch the archive file from an upstream source, where the archive file may be associated with the dependency information indicative of the one or more class files. The processing device may apply a transformation to the archive file to indicate provenance information for each of the one or more class files included in the archive file. The archive file may be incorporated in an application or a library, such that a scan of the application or the library may be performed for the provenance information associated with the archive file. An indication of each of the one or more class files included in the archive file may be output in view of the provenance information.

15 Claims, 9 Drawing Sheets

100

(56) References Cited

OTHER PUBLICATIONS

Examination Report from related EP Application No. 22 214 220.0-1203 mailed Oct. 24, 2024. (5 pages).

Anonymous et al.: "Apache Maven—Wikipedia", Aug. 18, 2022 (Aug. 18, 2022), pp. 1-7, XP93071177, Retrieved from the Internet: <URL:https://en.wikipedia.org/w/index.php?title=Apache_Maven &oldid=1105050769#>, [retrieved on Nov. 26, 2024].

Anonymous: "Guide to naming conventions on groupId, artifactId, and version", , Aug. 9, 2022 (Aug. 9, 2022), pp. 1-1, XP093071184, Retrieved from the Internet: <URL: https://web.archive.org/web/ 20220809183500/https://maven.apache.org/guides/mini/guide-naming-conventions.html>, [retrieved on Nov. 26, 2024].

Anonymous: "Java class file—Wikipedia", Mar. 3, 2019 (Mar. 3, 2019), pp. 1-7, XP055844233, Retrieved from the Internet: <URL:https://web.archive.org/web/20190303180021/https://en. wikipedia.org/wiki/Java_class_file>, [retrieved on Nov. 26, 2024].

* cited by examiner

Central Repository 202

Other Repository 204

Class File Transformer 208

Server 206

Application or Library Builder 210

Built Application 212

Application Analyzer 214

Application Composition Information 216

200

UPSTREAM REPOSITORY 304

SERVER 305

PROCESSING DEVICE 360a

CLASS FILE TRANSFORMER 308

HOST SYSTEM 310

PROCESSING DEVICE 360b

APPLICATION BUILDER 302

300

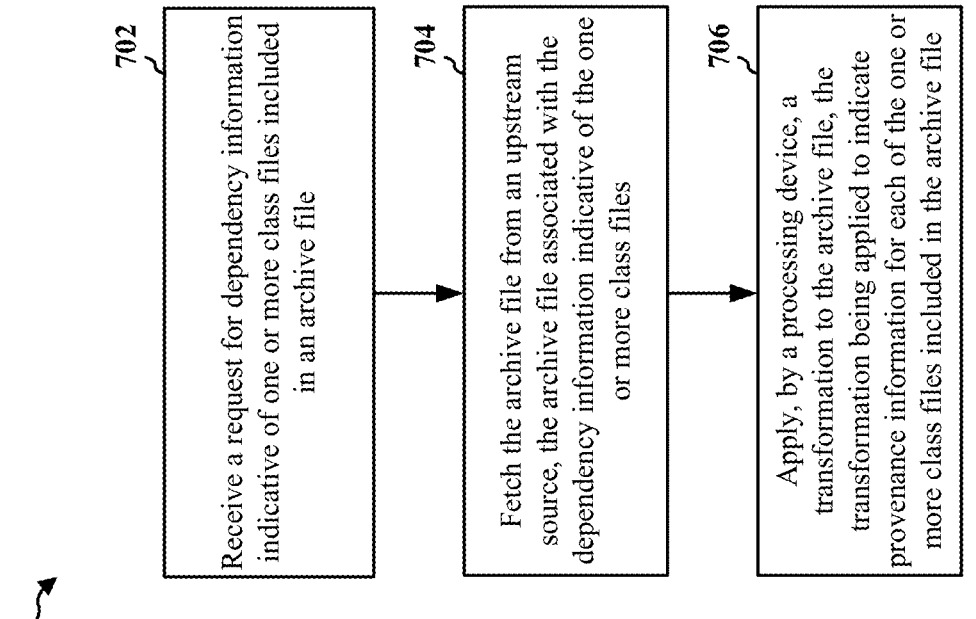

702 Receive a request for dependency information indicative of one or more class files included in an archive file 704 Fetch the archive file from an upstream source, the archive file associated with the dependency information indicative of the one or more class files 706 Apply, by a processing device, a transformation to the archive file, the transformation being applied to indicate provenance information for each of the one or more class files included in the archive file

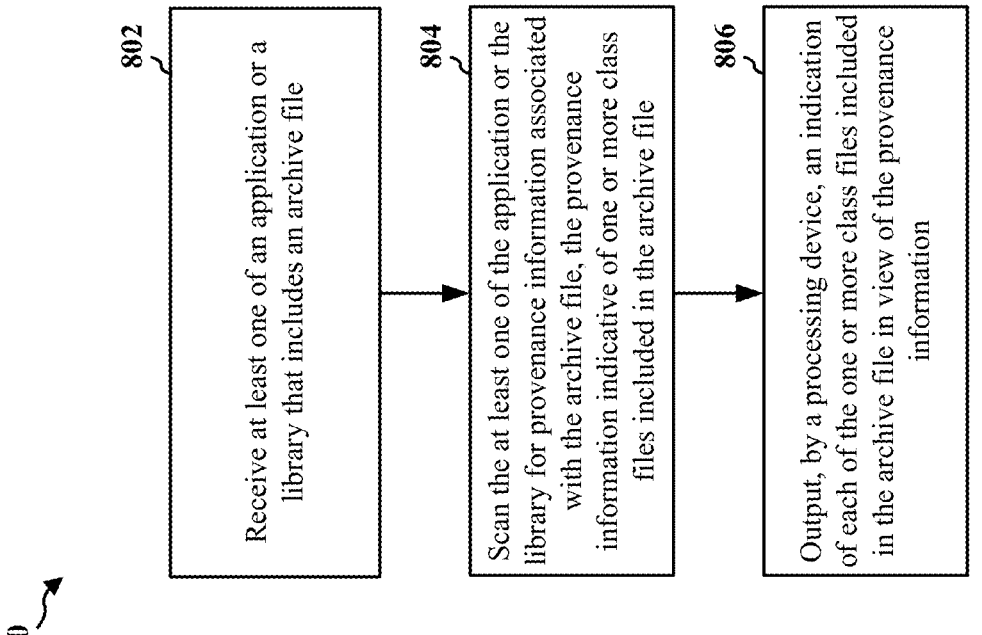

802

Receive at least one of an application or a library that includes an archive file

804

Scan the at least one of the application or the library for provenance information associated with the archive file, the provenance information indicative of one or more class files included in the archive file

806

Output, by a processing device, an indication of each of the one or more class files included in the archive file in view of the provenance information

Static Memory 906

Video Display Unit 910

Alphanumeric Input Device 912

Cursor Control Device 914

Acoustic Signal Generation Device 916

Data Storage Device 918

Machine-Readable Storage Medium 928

Instructions 925

Provenance Information Analyzer 102

Provenance Information Embedder 103

930

Processing Device 902

Instructions 925

Provenance Information Analyzer 102

Provenance Information Embedder 103

Main Memory 904

Instructions 925

Provenance Information Analyzer 102

Provenance Information Embedder 103

Network Interface Device 908

Network 920

DEPENDENCY ANALYSIS THROUGH CLASS FILE MANIPULATION

TECHNICAL FIELD

Aspects of the present disclosure relate to class file manipulation, and more particularly, to implementing a dependency analysis based on provenance tracking.

BACKGROUND

An application builder may build an application using archive files, which may be compiled from a number of class files. An output of a built application may be based on one or more class file dependencies, class file shading, etc. Some tools, such as security scanning tools, may have to determine the class files associated with an output of the application and/or a repository from which the class files originated.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

FIG. 7 is a flow diagram of a method of embedding provenance information in an archive file for each class file included in the archive file, in accordance with some embodiments.

FIG. 8 is a flow diagram of a method of indicating class files included in an application, in accordance with some embodiments.

FIG. 9 is a block diagram of an example computing device that may perform one or more of the operations described herein, in accordance with some embodiments.

DETAILED DESCRIPTION

Figure 1:
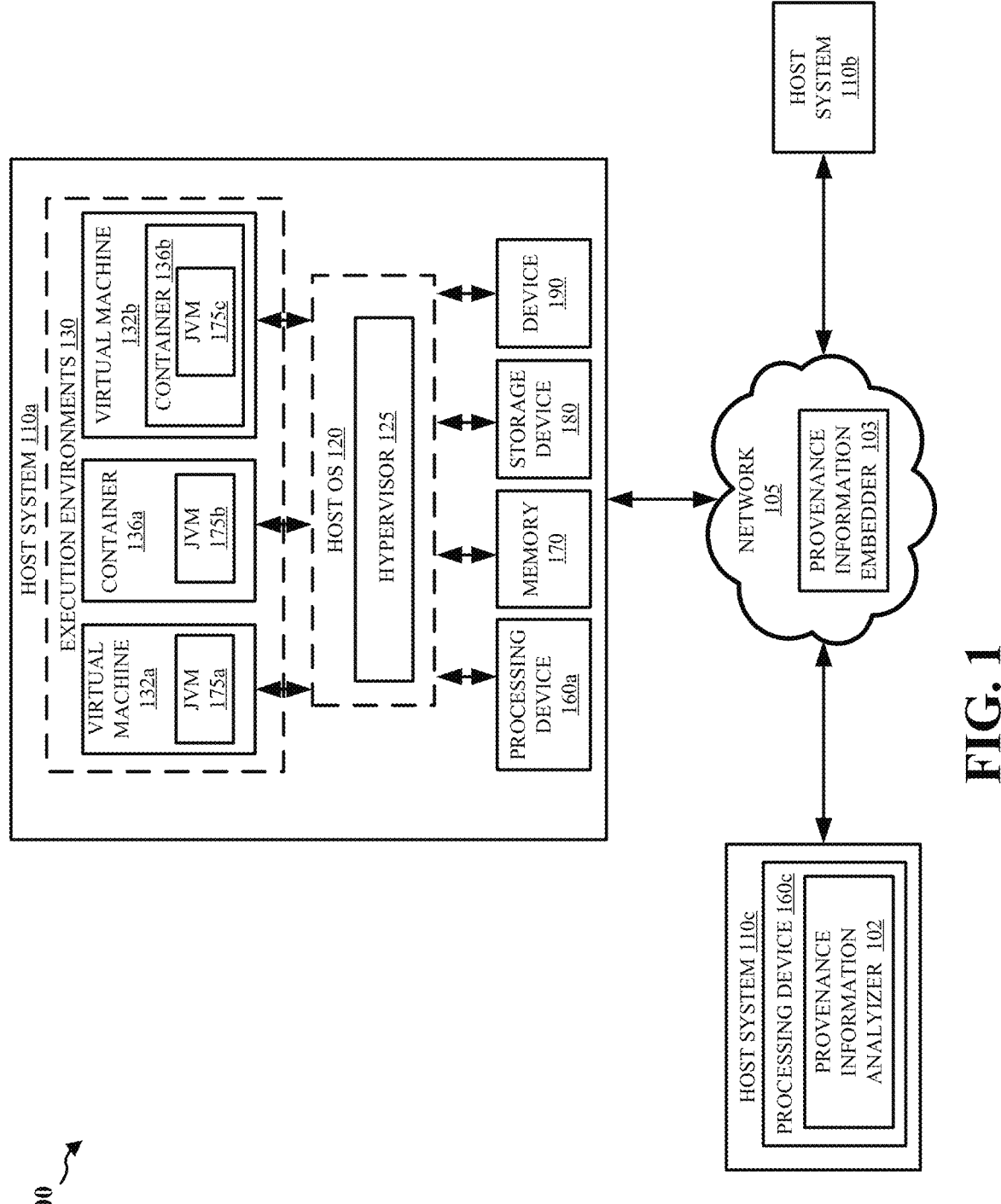
FIG. 1 depicts a high-level component diagram of an illustrative example of a computing architecture, in accordance with one or more aspects of the present disclosure.

Class files may be combined into archive files, such as Java archive (JAR) files, which may be further combined into an application. The combination of the class files into the archive file may generate a dependency, where a first class file of the class files may be dependent upon a second class file of the class files. One or more class file dependencies may be incorporated in a compiled archive file. In examples, the dependencies may be "shaded" such that the names of the class files may be changed in the output of the application. Shading refers to the incorporation of a class file from an existing archive file into a generated archive file, often with a changed name, so that the generated archive file may be executed without the existing archive file being on the classpath. Such dependencies and/or name changes to the class files may generate complexities associated with determining which class files are included in the output of the application and from which repositories the class files originated.

Conventional approaches for determining the class files associated with the output of the application have utilized tooling that attempts to confirm the dependencies in the output. For example, the tooling may attempt to determine reverse operations of an application building procedure to further determine the class files that were included in the application. However, such procedures of the tooling may be complex and may be prone to errors, as different versions of application building tools, such as Maven or Gradle, may be based on algorithms of different resolutions.

Plug-ins may also impact the application building procedure, which may generate additional complexities associated with determining which class files are included in the output of the application. An application built from archive files may include an "uber JAR", which may also be referred to as a "fat JAR", that includes a number of class files. Uber JAR/fat JAR refers to a grouping of the class files on a classpath into a single/merged archive file (e.g., single/merged JAR file).

Class file information may be utilized for a number of procedures. For example, security scanning tools may utilize class file information to determine whether vulnerable versions of class files have been incorporated in the application, regardless of whether the class files have been renamed via a shading procedure, plug-in, etc. In cases where class file dependencies are rebuilt from source code, some tools may have to determine whether classes included in a service or library originated from a community repository.

Aspects of the disclosure address the above-noted and other deficiencies by utilizing provenance information to indicate the class files included in the built application. Provenance refers to recording the history of data and/or the location of origin of the data. For example, a server may apply a transformation to an archive file to encode each class file in the archive file with provenance information prior to providing the archive file to an application builder. The provenance information may include a group artifact version (GAV) associated with the class file, a repository from which the class file originated, a dependency of the class file, build information of the module that includes the class file, etc. The application builder may then build the application in view of the archive file that includes provenance information for each class of the archive file.

Embedding the provenance information in the class files (e.g., as bytecode level metadata) may allow the provenance information to be machine-readable without affecting the operations of the classes. The provenance information may be indicative of a dependency included in the generated archive file. The provenance information may be embedded based on a custom annotation in a Runtime Invisible Annotations portion of the class file, a custom java virtual machine (JVM) class file annotation, and/or encoding the provenance information as an unreferenced object in a constant pool. The embedded information may allow the provenance of the class files to be tracked, even if the class files are integrated into other archive files or applications.

After the application builder completes the build of the application using the archive file that includes the embedded provenance information for each class of the archive file, an analyzer tool may scan the application for class files. The embedded provenance information may indicate the class files included in the application, even if the class files were integrated into an archive file. Accordingly, the application analyzer may determine the class files included in the application, regardless of the tools, plug-ins, and/or other variables associated with the application building procedure.

FIG. 1 depicts a high-level component diagram of an illustrative example of a computing architecture 100, in accordance with one or more aspects of the present disclosure. However, other computing architectures 100 are possible, and the implementation of a computer system utilizing examples of the disclosure are not necessarily limited to the specific architecture depicted by FIG. 1. The computing architecture 100 may utilize one or more virtual network layers to facilitate communications between different types of execution environments 130 of the computing architecture 100. The execution environments 130 may be a virtual machine (VM), a container, one or more containers residing within the VM, or any combination thereof.

Referring to FIG. 1, the computing architecture 100 includes VMs 132a and 132b, containers 136a and 136b, and Java virtual machines (JVMs) 175a, 175b, and 175c. The JVMs may reside within containers 136a and 136b and/or within VMs 132a and 132b. For example, JVM 175a resides within VM 132a, JVM 175b resides within container 136a, and JVM 175c resides within container 136b which further resides within VM 132b. The JVMs may also reside directly within hosts (not illustrated in FIG. 1). The containers may reside within hosts or within VMs as illustrated in FIG. 1. The containers may reside within the same or different VMs on the same or different hosts.

As shown in FIG. 1, computing architecture 100 includes host systems 110a, 110b, and 110c. The host systems 110a, 110b, and 110c may include one or more processing devices 160a and 160c, memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect (PCI) solid state drive, a Redundant Array of Independent Disks (RAID) system, a network attached storage (NAS) array, etc.), and one or more devices 190 (e.g., a Peripheral Component Interconnect (PCI) device, network interface controller (NIC), a video card, an input/output (I/O) device, etc.).

In certain implementations, memory 170 may be non-uniform access (NUMA), such that memory access time depends on the memory location relative to processing devices 160a or 160c. It should be noted that although, for simplicity, two processing devices 160a and 160c, and a single storage device 180 and device 190 are depicted in FIG. 1, other embodiments of host systems 110a, 110b, and 110c may include multiple processing devices, multiple storage devices, or multiple devices. Processing devices 160a and 160c may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing devices 160a and 160c may also include one or more special-purpose processing devices, such as an application specific integrated circuit (ASIC), a field programmable gate array (FPGA), a digital signal processor (DSP), network processor, or the like.

The host systems 110a, 110b, and 110c may be servers, mainframes, workstations, personal computers (PC), mobile phones, palm-sized computing devices, etc. In some examples, host systems 110a, 110b, and 110c may be separate computing devices. In some examples, host systems 110a, 110b, and 110c may be implemented by a single computing device. For clarity, some components of host systems 110b and 110c are not shown. Furthermore, although computing architecture 100 is illustrated as having three host systems, examples of the disclosure may utilize any number of host systems.

Host systems 110a, 110b, and 110c may additionally include execution environments 130, which may include one or more VMs 132a and 132b, containers 136a and 136b, container 136b residing within VM 132b, JVMs 175a, 175b, and 175c, and a host operating system (OS) 120. VM 132a and VM 132b are software implementations of machines that execute programs as though they were actual physical machines. Containers 136a and 136b can act as isolated execution environments for different workloads of services, as previously described. JVMs 175a, 175b, and 175c can enable an execution environment to run Java programs as well as programs written in other languages that can be compiled to Java bytecode. Host OS 120 manages the hardware resources of the computer system and can provide functions such as inter-process communication, scheduling, and memory management.

Host OS 120 may include a hypervisor 125 (which may also be known as a virtual machine monitor (VMM)), which provides a virtual operating platform for VMs 132a and 132b and manages their execution. Hypervisor 125 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 125, though typically implemented in software, may emulate and export a bare machine interface to higher level software in the form of virtual processors and guest memory. Higher level software may comprise a standard or real-time OS, may be a highly stripped-down operating environment with limited operating system functionality, and may or may not include traditional OS facilities, etc. Hypervisor 125 may present other software (e.g., "guest" software) the abstraction of one or more VMs that provide the same or different abstractions to various guest software (e.g., guest operating system, guest applications). It should be noted that in some alternative implementations, hypervisor 125 may be external to host OS 120, rather than embedded within host OS 120, or may replace host OS 120.

The host systems 110a, 110b, and 110c are coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g., cell towers), etc. The network 105 may carry communications (e.g., data, message, packets, frames, etc.) between the various components of host systems 110a, 110b, and 110c.

In embodiments, the network 105 may employ a provenance information embedder 103 to embed provenance information for each class file in a compiled archive file, such as a JAR file. The embedded provenance information may be received at a host to determine class file dependencies, class file shading, etc., within the compiled archive file and/or a built application. For example, host system 110c may employ a provenance information analyzer 102 using a processing device 160c to analyze the embedded provenance information and generate an output indicative of archive file and/or application composition information. Further details regarding provenance information embedding and analyzing will be discussed below.

Figure 2:
FIG. 2 illustrates a flow diagram for utilizing provenance information to indicate class files included in a built application, in accordance with one or more aspects of the present disclosure.

FIG. 2 illustrates a flow diagram 200 for utilizing provenance information to indicate class files included in a built application 212, in accordance with one or more aspects of the present disclosure. Java is a compiled language where source java files may be compiled to class files, and then distributed in an archive file, such as a JAR file. Some techniques include receiving existing class files from another JAR file, and combining the existing class files into a different/generated JAR file for distribution, such as an uber JAR/fat JAR. A library that includes one or more dependencies associated with the class files may be based on shading procedures, where a class file from an existing JAR file may be incorporated into the different/generated JAR file, so that the generated JAR file may be executed without the existing JAR file being on the classpath.

Since an end user might not know where the class files have originated from, techniques described herein include embedding tracking data (e.g., provenance information) into each class file to indicate an origin of each of the class files. The tracking data/provenance information may include a GAV associated with each class file, a build time, data and environment information, a device performing the build, etc. The provenance information may also indicate a repository, such as a central repository 202 or other repository 204, from which each class file originated, class file dependency information, etc. The provenance information may be encoded directly into each class file in the generated JAR file.

In examples, the provenance information may be used for security procedures. If a security vulnerability has been detected for a specific library, which may have been shaded into other libraries, the provenance information may indicate which other applications and/or libraries are also vulnerable. By encoding the provenance information into each class file, security data may be made available to security scanning tools.

A server 206, which may be a smart Maven repository server/smart proxy server, may receive a request from an application or library builder 210 to fetch a dependency artifact from an upstream source, such as the central repository 202 or other repository 204. That is, the application or library builder 210 may download dependencies from the server 206 (e.g., smart server) rather than from a traditional repository. The server 206 can serve the JAR files to the application or library builder 210, but since not all of the JAR files may be incorporated into the built application 212, dependency information may be difficult to determine without class file tracking information. By adding the tracking information/data into the JAR files as the JAR files are being served to the application or library builder 210, an application analyzer 214 may determine, based on tracking metadata, which class files ended up being incorporated into the built application 212 by the application or library builder 210.

The server 206 may employ a class file transformer 208 to perform a transformation on each of the class files included in the JAR file. Hence, dependencies may be tracked at the class file level. Thus, even if a JAR file is decompiled and class files are renamed before being incorporated into the built application 210, the application analyzer 214 can still identify the JAR file from which the class files originated. The application or library builder 210 may be in a different piece of hardware from the server 206 in cases where the transformation occurs over the network. For instance, the server 206 may fetch, from the central repository 202 and/or other repository 204, one or more class files/JAR files associated with a dependency and utilize the class file transformer 208 to apply a transformation to each of the class files prior to providing the one or more class files/JAR files to the application or library builder 210.

An output of the built application 212 may correspond to a file or a collection of files. In further examples, the output of the built application 212 may correspond to a container. The file(s) and/or container(s) may be analyzed by the application analyzer 214 to determine which class files were incorporated into the built application 212 by the application or library builder 210. For security purposes, if an application is built from source, the application may be rebuilt if there is determined to be a security vulnerability. Building the application from source and know where each class file originated from may allow a processing device to determine whether one or more community dependencies were downloaded and incorporated into the application build. A software bill of materials (SBoM) may be generated to indicate/ list features associated with the application build. For example, the SBoM may indicate where the application was built, which processing device built the application, etc.

After the application analyzer 214 receives the output of the built application 212, the application analyzer 214 may scan the output for provenance information associated with one or more class files included in the built application 212. The provenance information may include bytecode level metadata indicative of each class file included in the built application 212. The application analyzer 214 may output application composition information 216 based on the class files determined to be included in the built application 212.

Figure 3:
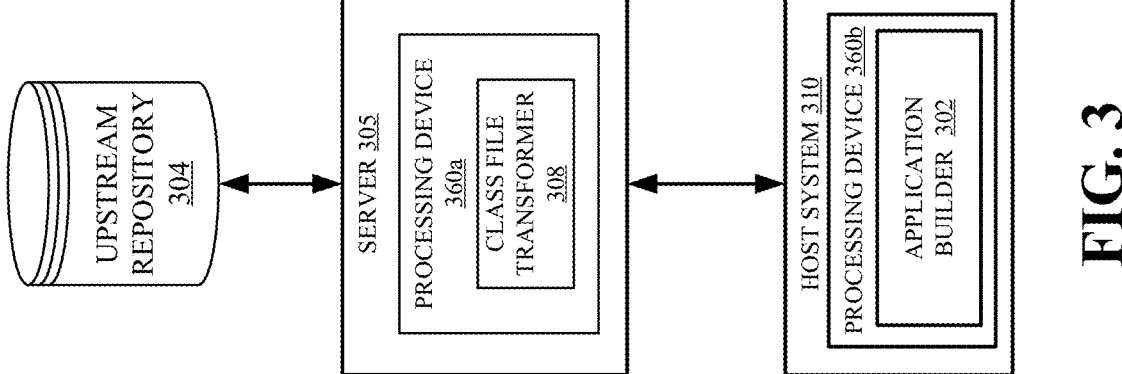
FIG. 3 is an illustration of an example computing architecture including a server that embeds class file tracking information into archive files provided to an application builder, in accordance with embodiments of the disclosure.
Figure 3:

FIG. 3 is an illustration of an example computing architecture 300 including a server 305 that embeds class file tracking information into archive files provided to an application builder 302, in accordance with embodiments of the disclosure. The computing architecture 300 may correspond to the computing architecture 100, as previously described at FIG. 1. For clarity, some elements of the computing architecture 100 are not shown in the computing architecture 300. Further, other elements in the computing architecture 300 are added to the computing architecture 100 to illustrate further details.

Referring to FIG. 3, the computing architecture 300 includes an upstream repository 304, a server 305, and a host system 310. The upstream repository 304 may correspond to the central repository and/or other repository illustrated in FIG. 2. The upstream repository 304 may store one or more class files that can be fetched by the server 305. For example, the server 305 may receive a request from a host system 310 that causes the server 305 to fetch one or more class files from the upstream repository. A processing device 360a at the server 305 may execute a class file transformer 308 on the one or more class files fetched from the upstream repository to perform a transformation on the one or more class files. The transformation allows the server 305 to embed provenance information for each class file included in archive file, where the provenance information is indicative of the one or more class files incorporated in a built application.

In embodiments, a host system 310 in communication with the server 305 may be used to build an application. The host system 310 may request archive files from the server 305 to perform an application building procedure. Archive files received from the server 305 may include the one or more class files having the embedded provenance information, so that after the application is built, the embedded provenance information may indicate which class files of the one or more class files received from the server 305 have been incorporated into the built application. The host system 310 includes a processing device 360b that executes an application builder 302 at the host system 310. The application builder 302 is configured to build an application based on the archive files received from the server 305 including the embedded provenance information. An output of the application built by the application builder 302 may be associated with bytecode level metadata indicative of the embedded provenance information.

Figure 4:
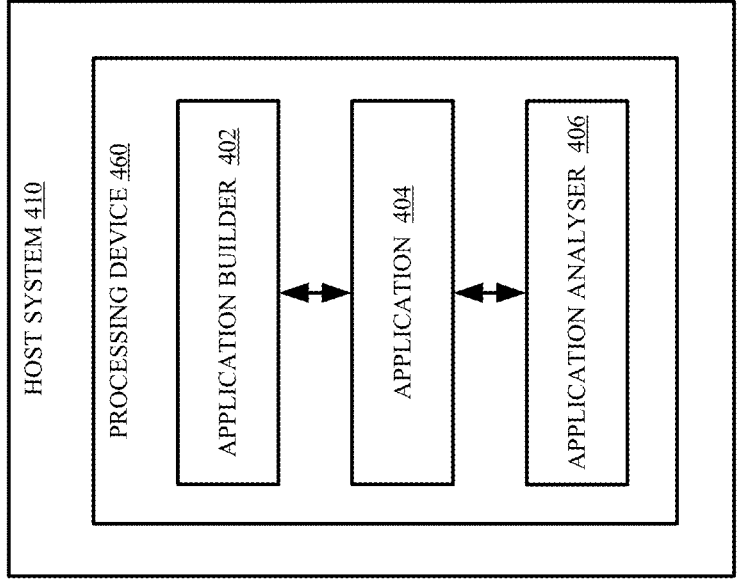
FIG. 4 is an illustration of an example host system included in an example computing architecture, in accordance with embodiments of the disclosure.
Figure 4:

FIG. 4 is an illustration of an example host system 410 included in an example computing architecture 400, in accordance with embodiments of the disclosure. The host system 410 is configured to analyze an output of a built application to determine one or more class files included in the built application. The one or more class files may be indicated based on bytecode level metadata associated with the embedded provenance information for each class file in archive files used to build the application. The host system 410 may correspond to the host system 110a, 110b, or 110c of the computing architecture 100, as previously described at FIG. 1. For clarity, some elements of the host system 110a, 110b, 110c/computing architecture 100 are not shown with respect to the host system 410. Further, other elements of the host system 410 are added to the host system 110a, 110b, 110c/computing architecture 100 to illustrate further details.

The host system 410 includes a processing device 460. The processing device 460 is configured to execute an application builder 402, an application 404 built by the application builder 402, and/or an application analyzer 406. In particular, execution of the application builder 402 by the processing device 460 may cause the processing device 460 to transmit a request to a server for archive files used to build an application. Upon receiving the archive files from the server, the processing device 460 may execute the application builder 402 to build an application 404 based on the archive files. The archive files received the server and used by the application builder 402 to build the application 404 may include embedded provenance information for each class file included in the archive file.

The processing device 460 may also execute the application 404 built by the application builder 402. Execution of the application 404 may be associated with an output that is received by the application analyzer 406. The application analyzer 406 scans the output of the application 404 for bytecode level metadata indicative of the embedded provenance information for each class file included in the archive files used to build the application 404. The scan performed by the application analyzer 406 may allow the processing device 460/host system 410 to determine the class files that were used to build the application 404.

Figure 5:
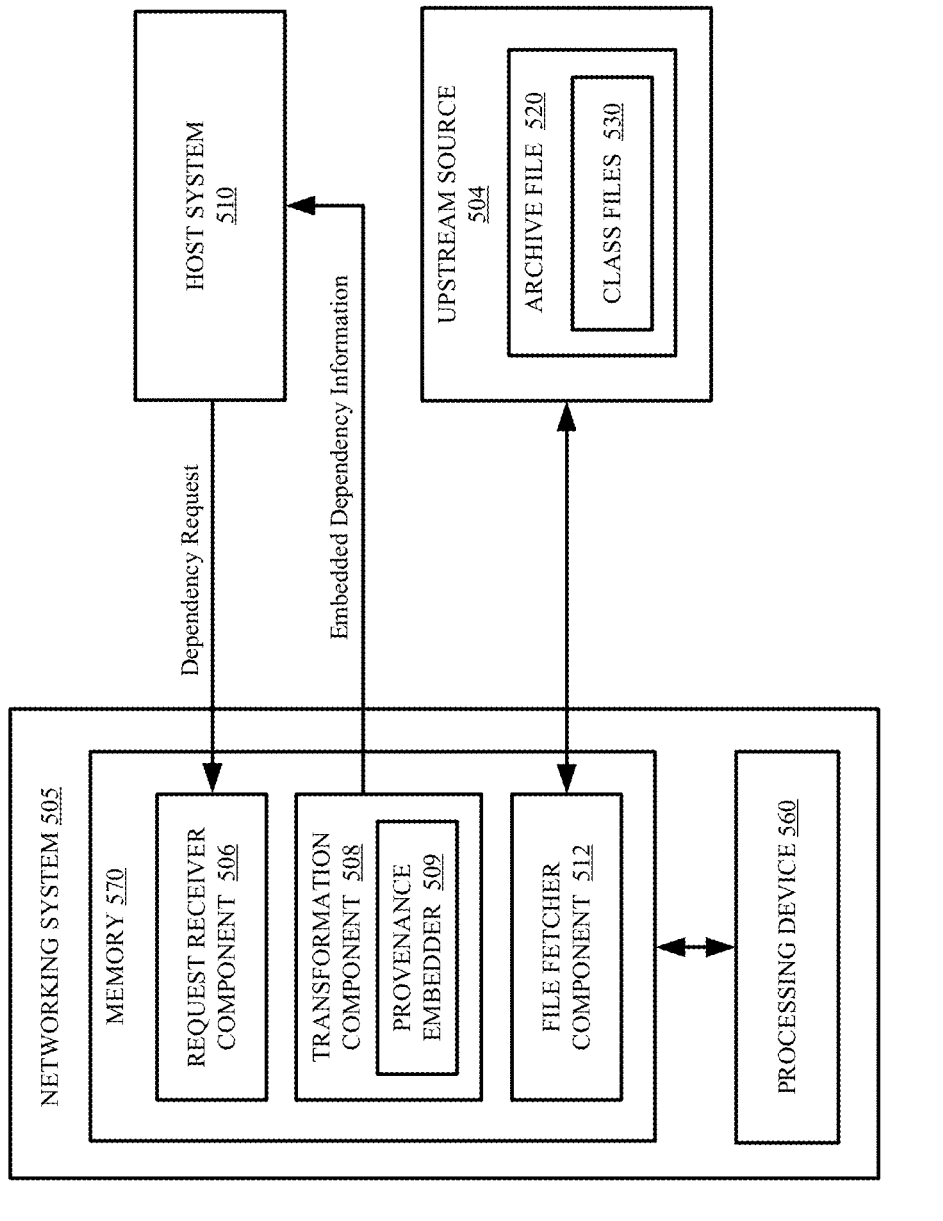
FIG. 5 is a component diagram of an example computing architecture, in accordance with embodiments of the disclosure.

FIG. 5 is a component diagram of an example computing architecture 500, in accordance with embodiments of the disclosure. The computing architecture 500 includes a networking system 505, a host system 510, and an upstream source 504. In examples, the networking system 505 and the host system 510 may correspond to the network and the host system of FIG. 1.

The networking system 505 includes a memory 570 and a processing device 560 that is operatively coupled to the memory 570. The memory 570, when executed by the processing device 560, can cause the networking system 505 to perform a plurality of functions. Example functions of the networking system 505 include receiving a request from the host system 510 for dependency information associated with one or more class files, fetching files from the upstream source 504, transforming fetched files to include embedded provenance information, etc. In the illustrated embodiment, the memory 570 includes a request receiver component 506 configured to receive the dependency request from the host system 510, a file fetcher component 512 configured to fetch archive files 520 and/or class files 530 from the upstream source 504, and a transformation component 508 configured to transform the archive files 520 to include provenance information for each class file 530 included in the archive file 520. The transformation component 508 may employ a provenance embedder 509 to embed the provenance information for each class file 530 in a transformed archive file transmitted to the host system 510.

The host system 510, which may include an application builder (not illustrated in FIG. 5), may transmit a dependency request to the networking system 505 for building an application. In particular, the host system 510 may request archive files 520 for building the application, which can have provenance information embedded in the requested archive files to indicate which class files ended up in the application built at the host system 510 by the application builder. The networking system 505 may transmit, based on the dependency request, the archive files 520 to the host system 510 for the host system 510 to build the application, after the networking system 505 embeds the dependency information in the archive files 520 fetched from upstream source 504.

The upstream source 504 may store one or more archive files 520. Each archive file 520 may be compiled from one or more class files 530. The upstream source 504 may receive an indication from the networking system 505 of one or more files to be fetched from the upstream source 504. The one or more files may be provided to the networking system 505 based on the file fetching operation of the networking system 505.

Figure 6:
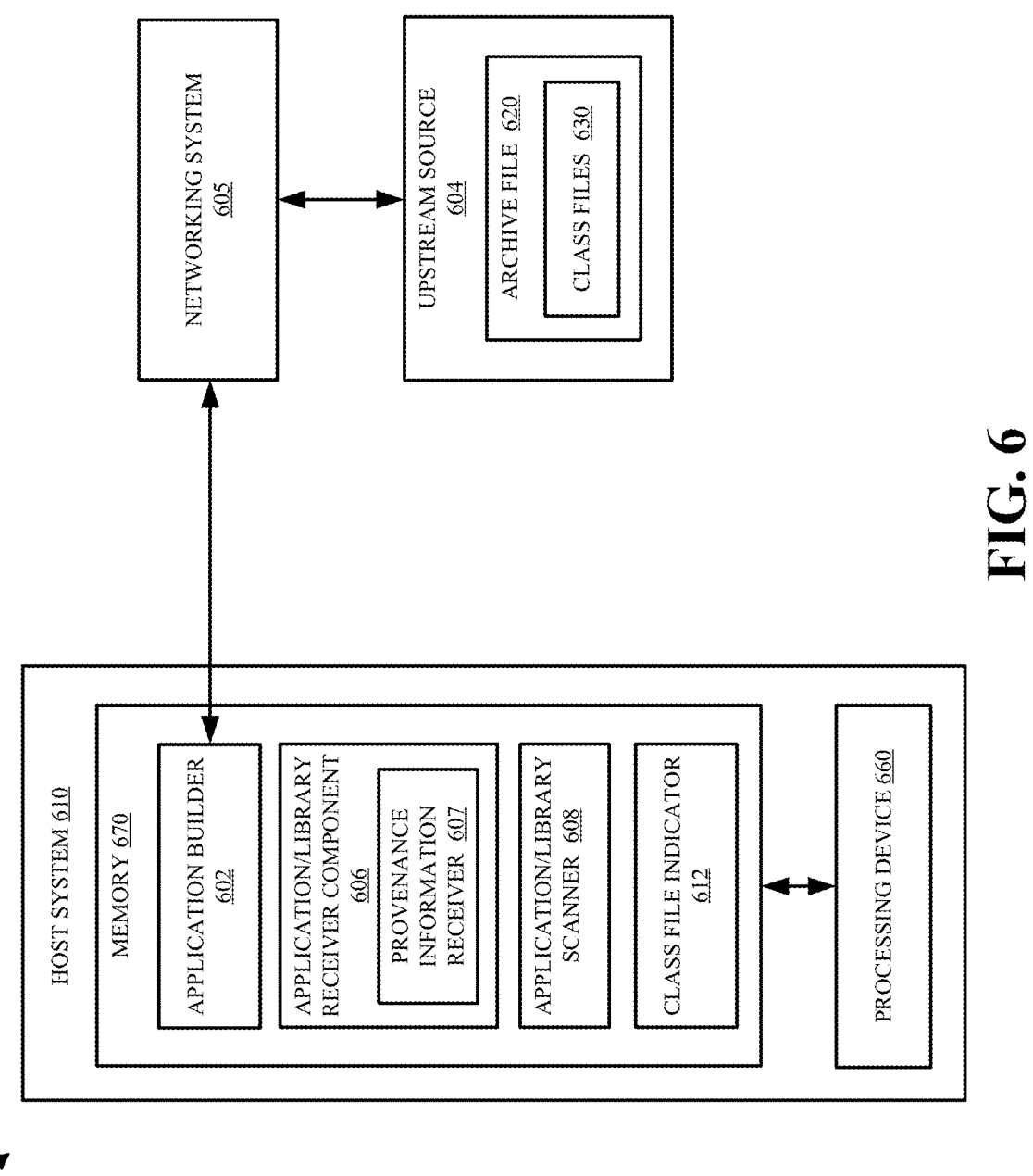
FIG. 6 is a component diagram of an example computing architecture, in accordance with embodiments of the disclosure.

FIG. 6 is a component diagram of an example computing architecture 600, in accordance with embodiments of the disclosure. The computing architecture 600 includes a host system 610, a networking system 605, and an upstream source 604. In examples, the networking system 605 and the host system 610 may correspond to the network and the host system of FIG. 1.

The host system 610 includes a memory 670 and a processing device 660 that is operatively coupled to the memory 670. The memory 670, when executed by the processing device 660, can cause the host system 610 to perform a plurality of functions. Example functions of the host system 610 include receiving an application/library that includes an archive file 620, scanning the application/library for provenance information indicative of the class files 630 included in the archive file 620, outputting an indication of the class files 630 included in the archive file 620, etc. In the illustrated embodiment, the memory 670 includes an application builder 602 configured to build an application from archive files 620 received from the networking system 605, an application/library receiver component 606 configured to receive a built application from the application builder 602, an application/library scanner 608 configured to scan the received application/library for provenance information associated with the archive file 620, a class file indicator 612 configured to output an indication of each of the class files 630 included in the built application, etc. The application/library receiver component 606 may further include a provenance information receiver 607 configured to receive embedded provenance information for an application built by the application builder 602.

Archive files 620 transmitted to the host system 610 from the networking system 605 may be fetched by the networking system 605 from the upstream source 604. The upstream source 604 may store one or more archive files 620. Each archive file 620 may be compiled from one or more class files 630. The upstream source 604 may receive an indication from the networking system 605 of one or more files to be fetched from the upstream source 604. The one or more files may be provided to the networking system 605 based on the file fetching operation of the networking system 605.

FIG. 7 is a flow diagram of a method 700 of embedding provenance information in an archive file for each class file included in the archive file, in accordance with some embodiments. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 700 may be performed by the provenance information embedder 103 of FIG. 1.

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 have to be performed.

Method 700 begins at block 702, where the processing logic receives a request for dependency information indicative of one or more class files included in an archive file. For example, the processing logic may receive a request for an archive file that includes one or more dependent file classes.

At block 704, the processing logic fetches the archive file from an upstream source, the archive file associated with the dependency information indicative of the one or more class files.

At block 706, the processing logic applies, by a processing device, a transformation to the archive file, the transformation being applied to indicate provenance information for each of the one or more class files included in the archive file. For example, applying the transformation to the archive file may transform the archive file into a modified archive file having provenance information for each of the one or more class files included in the modified archive file. Applying the transformation to the archive file can further include encoding the provenance information within the archive file for each of the one or more class files included in the archive file.

FIG. 8 is a flow diagram of a method 800 of indicating class files included in an application, in accordance with some embodiments. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 800 may be performed by the provenance information analyzer 102 of FIG. 1.

With reference to FIG. 8, method 800 illustrates example functions used by various embodiments. Although specific function blocks ("blocks") are disclosed in method 800, such blocks are examples. That is, embodiments are well suited to performing various other blocks or variations of the blocks recited in method 800. It is appreciated that the blocks in method 800 may be performed in an order different than presented, and that not all of the blocks in method 800 have to be performed.

Method 800 begins at block 802, where the processing logic receives at least one of an application or a library that includes an archive file.

At block 804, the processing logic scans the at least one of the application or the library for provenance information associated with the archive file, the provenance information indicative of one or more class files included in the archive file. For example, the provenance information may indicate each of the one or more class files in view of at least one of an annotation or an unreferenced object included in a constant pool.

At block 806, the processing logic outputs, by a processing device, an indication of each of the one or more class files included in the archive file in view of the provenance information. For example, the provenance information indicative of the one or more class files may be encoded within the archive file, such that the processing logic decodes the provenance information to output the indication of each of the one or more class files included in the archive file. The indication of each of the one or more class files included in the archive file may be indicative of dependency information associated with the one or more class files included in the archive file.

FIG. 9 is a block diagram of an example computing device 900 that may perform one or more of the operations described herein, in accordance with some embodiments. Computing device 900 may be connected to other computing devices in a LAN, an intranet, an extranet, and/or the Internet. The computing device 900 may operate in the capacity of a server machine in client-server network environment or in the capacity of a client in a peer-to-peer network environment. The computing device 900 may be provided by a personal computer (PC), a set-top box (STB), a server, a network router, switch or bridge, or any machine capable of executing a set of instructions (sequential or otherwise) that specify actions to be taken by that machine. Further, while only a single computing device 900 is illustrated, the term "computing device" shall also be taken to include any collection of computing devices that individually or jointly execute a set (or multiple sets) of instructions to perform the methods discussed herein.

The example computing device 900 may include a processing device 902 (e.g., a general purpose processor, a PLD, etc.), a main memory 904 (e.g., synchronous dynamic random access memory (DRAM), read-only memory (ROM)), a static memory 906 (e.g., flash memory), and a data storage device 918, which may communicate with each other via a bus 930.

Processing device 902 may be provided by one or more general-purpose processing devices such as a microprocessor, central processing unit, or the like. In an illustrative example, processing device 902 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 902 may also include one or more special-purpose processing devices such as an application specific integrated circuit (ASIC), a field programmable gate array (FPGA), a digital signal processor (DSP), network processor, or the like. The processing device 902 may be configured to execute the operations described herein, in accordance with one or more aspects of the present disclosure, for performing the operations and steps discussed herein.

Computing device 900 may further include a network interface device 908 which may communicate with a network 920. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and an acoustic signal generation device 916 (e.g., a speaker). In one embodiment, video display unit 910, alphanumeric input device 912, and cursor control device 914 may be combined into a single component or device (e.g., an LCD touch screen).

Data storage device 918 may include a computer-readable storage medium 928 on which may be stored one or more sets of instructions 925 that may include instructions for a provenance information analyzer 102 and/or a provenance information embedder 103 for carrying out the operations described herein, in accordance with one or more aspects of the present disclosure. Instructions 925 may also reside, completely or at least partially, within main memory 904 and/or within processing device 902 during execution thereof by computing device 900, main memory 904 and processing device 902 also constituting computer-readable media. The instructions 925 may further be transmitted or received over a network 920 via network interface device 908.

While computer-readable storage medium 928 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method comprising: receiving a request for dependency information indicative of one or more class files included in an archive file; fetching the archive file from an upstream source, the archive file associated with the dependency information indicative of the one or more class files; and applying, by a processing device, a transformation to the archive file, the transformation being applied to indicate provenance information for each of the one or more class files included in the archive file.

Example 2 is the method of Example 1, further comprising: outputting the archive file to a build module in view of the transformation that indicates the provenance information for each of the one or more class files included in the archive file.

Example 3 is the method of any of Examples 1-2, wherein applying the transformation to the archive file further comprises: encoding the provenance information within the archive file for each of the one or more class files included in the archive file.

Example 4 is the method of any of Examples 1-3, wherein the provenance information is indicated for each of the one or more class files in view of at least one of an annotation or an unreferenced object included in a constant pool.

Example 5 is the method of any of Examples 1-4, wherein the provenance information for each of the one or more class files included in the archive file corresponds to bytecode metadata.

Example 6 is the method of any of Examples 1-5, wherein the provenance information indicates at least one of a GAV of a module that includes the one or more class files, a repository of the one or more class files, a dependency associated with the one or more class files, or build information of the module that includes the one or more class files.

Example 7 is the method of any of Examples 1-6, wherein applying the transformation to the archive file transforms the archive file into a modified archive file having the provenance information for each of the one or more class files included in the modified archive file.

Example 8 is the method of any of Examples 1-7, wherein the modified archive file is incorporated in a container.

Example 9 is a system comprising: a memory; and a processing device, operatively coupled to the memory, to: receive a request for dependency information indicative of one or more class files included in an archive file; fetch the archive file from an upstream source, the archive file associated with the dependency information indicative of the one or more class files; and apply, by the processing device, a transformation to the archive file, the transformation being applied to indicate provenance information for each of the one or more class files included in the archive file.

Example 10 is the system of Example 9, wherein the processing device is further to: output the archive file to a build module in view of the transformation that indicates the provenance information for each of the one or more class files included in the archive file.

Example 11 is the system of any of Examples 9-10, wherein to apply the transformation to the archive file the processing device is further to: encode the provenance information within the archive file for each of the one or more class files included in the archive file.

Example 12 is the system of any of Examples 9-11, wherein the provenance information is indicated for each of the one or more class files in view of at least one of an annotation or an unreferenced object included in a constant pool.

Example 13 is the system of any of Examples 9-12, wherein the provenance information for each of the one or more class files included in the archive file corresponds to bytecode metadata.

Example 14 is the system of any of Examples 9-13, wherein the provenance information indicates at least one of a GAV of a module that includes the one or more class files, a repository of the one or more class files, a dependency associated with the one or more class files, or build information of the module that includes the one or more class files.

Example 15 is the system of any of Examples 9-14, wherein application of the transformation to the archive file transforms the archive file into a modified archive file having provenance information for each of the one or more class files included in the modified archive file.

Example 16 is the system of any of Examples 9-15, wherein the modified archive file is incorporated in a container.

Example 17 is a non-transitory computer-readable storage medium including instructions that, when executed by a processing device, cause the processing device to: receive a request for dependency information indicative of one or more class files included in an archive file; fetch the archive file from an upstream source, the archive file associated with the dependency information indicative of the one or more class files; and apply, by the processing device, a transformation to the archive file, the transformation being applied to indicate provenance information for each of the one or more class files included in the archive file.

Example 18 is the non-transitory computer-readable storage medium of Example 17, wherein the processing device is further to: output the archive file to a build module in view of the transformation that indicates the provenance information for each of the one or more class files included in the archive file.

Example 19 is the non-transitory computer-readable storage medium of any of Examples 17-18, wherein to apply the transformation to the archive file the processing device is further to: encode the provenance information within the archive file for each of the one or more class files included in the archive file.

Example 20 is the non-transitory computer-readable storage medium of any of Examples 17-19, wherein the provenance information is indicated for each of the one or more class files in view of at least one of an annotation or an unreferenced object included in a constant pool.

Example 21 is the non-transitory computer-readable storage medium of any of Examples 17-20, wherein the provenance information for each of the one or more class files included in the archive file corresponds to bytecode metadata.

Example 22 is the non-transitory computer-readable storage medium of any of Examples 17-21, wherein the provenance information indicates at least one of a GAV of a module that includes the one or more class files, a repository of the one or more class files, a dependency associated with the one or more class files, or build information of the module that includes the one or more class files.

Example 23 is the non-transitory computer-readable storage medium of any of Examples 17-22, wherein application of the transformation to the archive file transforms the archive file into a modified archive file having provenance information for each of the one or more class files included in the modified archive file.

Example 24 is the non-transitory computer-readable storage medium of any of Examples 17-23, wherein the modified archive file is incorporated in a container.

Example 25 is an apparatus comprising: means for receiving a request for dependency information indicative of one or more class files included in an archive file; means for fetching the archive file from an upstream source, the archive file associated with the dependency information indicative of the one or more class files; and means for applying a transformation to the archive file, the transformation being applied to indicate provenance information for each of the one or more class files included in the archive file.

Example 26 is the apparatus of Example 25, further comprising: means for outputting the archive file to a build module in view of the transformation that indicates the provenance information for each of the one or more class files included in the archive file.

Example 27 is the apparatus of any of Examples 25-26, wherein the means for applying the transformation to the archive file is further to: encode the provenance information within the archive file for each of the one or more class files included in the archive file.

Example 28 is the apparatus of any of Examples 25-27, wherein the provenance information is indicated for each of the one or more class files in view of at least one of an annotation or an unreferenced object included in a constant pool.

Example 29 is the apparatus of any of Examples 25-28, wherein the provenance information for each of the one or more class files included in the archive file corresponds to bytecode metadata.

Example 30 is the apparatus of any of Examples 25-29, wherein the provenance information indicates at least one of a GAV of a module that includes the one or more class files, a repository of the one or more class files, a dependency associated with the one or more class files, or build information of the module that includes the one or more class files.

Example 31 is the apparatus of any of Examples 25-30, wherein the means for applying the transformation to the archive file transforms the archive file into a modified archive file having provenance information for each of the one or more class files included in the modified archive file.

Example 32 is the apparatus of any of Examples 25-31, wherein the modified archive file is incorporated in a container.

Example 33 is a method comprising: receiving at least one of an application or a library that includes an archive file; scanning the at least one of the application or the library for provenance information associated with the archive file, the provenance information indicative of one or more class files included in the archive file; and outputting, by a processing device, an indication of each of the one or more class files included in the archive file in view of the provenance information.

Example 34 is the method of Example 33, wherein the provenance information indicative of the one or more class files is encoded within the archive file, the method further comprising: decoding the provenance information to output the indication of each of the one or more class files included in the archive file.

Example 35 is the method of any of Examples 33-34, wherein the indication of each of the one or more class files included in the archive file is indicative of dependency information associated with the one or more class files included in the archive file.

Example 36 is the method of any of Examples 33-35, wherein the provenance information indicates each of the one or more class files in view of at least one of an annotation or an unreferenced object included in a constant pool.

Example 37 is a system for implementing the method as in any of Examples 33-36.

Example 38 is a non-transitory computer-readable storage medium to implement the method as in any of Examples 33-36.

Example 39 is an apparatus including means for implementing the method as in any of Examples 33-36.

Unless specifically stated otherwise, terms such as "receiving," "fetching," "applying," "outputting," "encoding," "decoding," "scanning," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the embodiments of the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the embodiments of the present disclosure is not to be limited to the details given herein, but may be modified within the scope and equivalents of the appended claims.

What is claimed is:

1. A method comprising:

receiving a request for dependency information indicative of one or more class files included in an archive file;

fetching the archive file from an upstream source, the archive file associated with the dependency information indicative of the one or more class files;

executing, by a processing device, a transformation process to the archive file, the transformation process being applied to indicate provenance information for each of the one or more class files included in the archive file, wherein the provenance information for each of the one or more class files included in the archive file corresponds to bytecode metadata, wherein the bytecode metadata is indicative of the provenance information embedded within the one or more class files;

scanning the archive file for the bytecode metadata to determine specific class files of the one or more class files utilized to build the archive file, wherein the bytecode metadata provides for a tracking of the one or more class files utilized to build the archive file; and outputting the archive file to a build module in view of the transformation process that indicates the provenance information for each of the one or more class files included in the archive file.

2. The method of claim 1, wherein executing the transformation process to the archive file further comprises:

encoding the provenance information within the archive file for each of the one or more class files included in the archive file.

3. The method of claim 1, wherein the provenance information is indicated for each of the one or more class files in view of at least one of an annotation or an unreferenced object included in a constant pool.

4. The method of claim 1, wherein the provenance information indicates at least one of a group artifact version (GAV) of a module that includes the one or more class files, a repository of the one or more class files, a dependency associated with the one or more class files, or build information of the module that includes the one or more class files.

5. The method of claim 1, wherein executing the transformation process to the archive file transforms the archive file into a modified archive file having the provenance information for each of the one or more class files included in the modified archive file.

6. The method of claim 5, wherein the modified archive file is incorporated in a container.

7. A system comprising:

a memory; and a processing device, operatively coupled to the memory, to:

receive a request for dependency information indicative of one or more class files included in an archive file;

fetch the archive file from an upstream source, the archive file associated with the dependency information indicative of the one or more class files;

execute a transformation process to the archive file, the transformation process being applied to indicate provenance information for each of the one or more class files included in the archive file, wherein the provenance information for each of the one or more class files included in the archive file corresponds to bytecode metadata, wherein the bytecode metadata is indicative of the provenance information embedded within the one or more class files;

scan the archive file for the bytecode metadata to determine specific class files of the one or more class files utilized to build the archive file, wherein the bytecode metadata provides for a tracking of the one or more class files utilized to build the archive file; and output the archive file to a build module in view of the transformation process that indicates the provenance information for each of the one or more class files included in the archive file.

8. The system of claim 7, wherein to execute the transformation process to the archive file the processing device is further to:

encode the provenance information within the archive file for each of the one or more class files included in the archive file.

9. The system of claim 7, wherein the provenance information is indicated for each of the one or more class files in view of at least one of an annotation or an unreferenced object included in a constant pool.

10. The system of claim 7, wherein the provenance information indicates at least one of a group artifact version (GAV) of a module that includes the one or more class files, a repository of the one or more class files, a dependency associated with the one or more class files, or build information of the module that includes the one or more class files.

11. The system of claim 7, wherein execution of the transformation process to the archive file transforms the archive file into a modified archive file having the provenance information for each of the one or more class files included in the modified archive file.

12. The system of claim 11, wherein the modified archive file is incorporated in a container.

13. A non-transitory computer-readable storage medium including instructions that, when executed by a processing device, cause the processing device to:

receive a request for dependency information indicative of one or more class files included in an archive file;

fetch the archive file from an upstream source, the archive file associated with the dependency information indicative of the one or more class files;

execute, by the processing device, a transformation process to the archive file, the transformation process being applied to indicate provenance information for each of the one or more class files included in the archive file, wherein the provenance information for each of the one or more class files included in the archive file corresponds to bytecode metadata, wherein the bytecode metadata is indicative of the provenance information embedded within the one or more class files;

scan the archive file for the bytecode metadata to determine specific class files of the one or more class files utilized to build the archive file, wherein the bytecode metadata provides for a tracking of the one or more class files utilized to build the archive file; and output the archive file to a build module in view of the transformation process that indicates the provenance information for each of the one or more class files included in the archive file.

14. The non-transitory computer-readable storage medium of claim 13, wherein to execute the transformation process to the archive file the processing device is further to:

encode the provenance information within the archive file for each of the one or more class files included in the archive file.

15. The non-transitory computer-readable storage medium of claim 13, wherein the provenance information is indicated for each of the one or more class files in view of at least one of an annotation or an unreferenced object included in a constant pool.

* * * * *